June 8, 1965 A. KOSS 3,187,635
APPARATUS FOR CUTTING LEMNISCATE RACES ON BALL BEARINGS
Filed Jan. 22, 1962 2 Sheets-Sheet 1

INVENTOR.
ADRIAN KOSS
BY
ATTORNEY

June 8, 1965  A. KOSS  3,187,635
APPARATUS FOR CUTTING LEMNISCATE RACES ON BALL BEARINGS
Filed Jan. 22, 1962  2 Sheets-Sheet 2

INVENTOR
ADRIAN KOSS

BY Jordon C. Leash
ATTORNEY 6,187,635
Patented June 8, 1965

3,187,635
APPARATUS FOR CUTTING LEMNISCATE RACES ON BALL BEARINGS
Adrian Koss, Mogadore, Ohio, assignor, by mesne assignments, to Magna Driver Corporation, Buffalo, N.Y., a corporation of New York
Filed Jan. 22, 1962, Ser. No. 167,809
2 Claims. (Cl. 90—20)

This invention relates to the manufacture of an improved universal joint which can be used as a coupling, socket joint, etc. The universal joint is designed particularly for transmitting constant-velocity rotary motion at any angle greater than zero and less than 90 degrees. The invention pertains to the formation of Bernoullian lemniscate races in universal joints containing more than two ball bearings. It includes the method and apparatus therefor.

The application is a continuation-in-part of my application Serial No. 731,299 filed April 28, 1958, now abandoned.

The races are evenly spaced about the knob with their longitudinal centers lying in planes which pass through the longitudinal axis of the male member.

The bottom surface of each race is, of course, spherical with its center concentric with the surface of the knob, and with the sides of the race rounded to the same radius as the ball bearing. The depth of each race is such that somewhat less than one-half of the surface of each ball bearing is exposed above the line along which the surface of the knob makes contact with a ball bearing located at the edge of the race. These races accurately accommodate the ball bearings held in a female member, when the male and female members are at any permissible angle to one another, and the movement of either member of such a joint transmits constant-velocity rotary motion to the other member.

In a universal joint in which there are more than two ball bearings, the outlines of the races must be Bernoullian lemniscates. There may be as many as six or eight or more ball bearings in such a universal joint, depending upon the size of the universal joint and the size of the ball bearings. The width of the two symmetrical halves of the lemniscate race of the ball bearing depends upon the maximum angle to which the two members of the universal joint can be moved out of alignment. This angle is less than 45 degrees.

The races are advantageously generated simultaneously. The knob of the male member is rotated in a socket or nest at the greatest angle to the axis of rotation at which the two members are designed to be operated. Cutting means is moved radially toward the center of the knob to the required depth in a plane that passes through the center of the knob and a planetary rotary motion is imparted to the knob. During the movement of the knob, its longitudinal axis describes a perfect cone, with its apex at the center of the knob and its axis perpendicular to said plane of the cutting means. Thus the path cut by each cutting means is the outline of a Bernoullian lemniscate, and the raised area or islet formed in the center of the bottom of each end of the race is subsequently removed. In the ultimate assembly, the movement of each ball in its race duplicates the motion of the cutter, when the male and female members are rotated at the maximum angle to one another.

Whatever the type of apparatus employed, mills are preferably employed as the cutting means, and the tips of the mills are preferably rounded to the same radius as that of the ball bearings, and the races are milled to a calculated depth in the knobs.

The edges of the races are preferably beveled to prevent the wear of the ball bearings from raising burrs at these edges, and a groove in the knob surface across the center of the lemniscates in a plane perpendicular to the axis of the knob, serves the same purpose.

The two members of the universal joint are preferably assembled with a cap and possibly also with a ring provided with a circular opening which, when the cap is attached to the female member, holds the male member in the socket.

The invention will be further described in connection with the accompanying drawings, in which—

Figure 1:
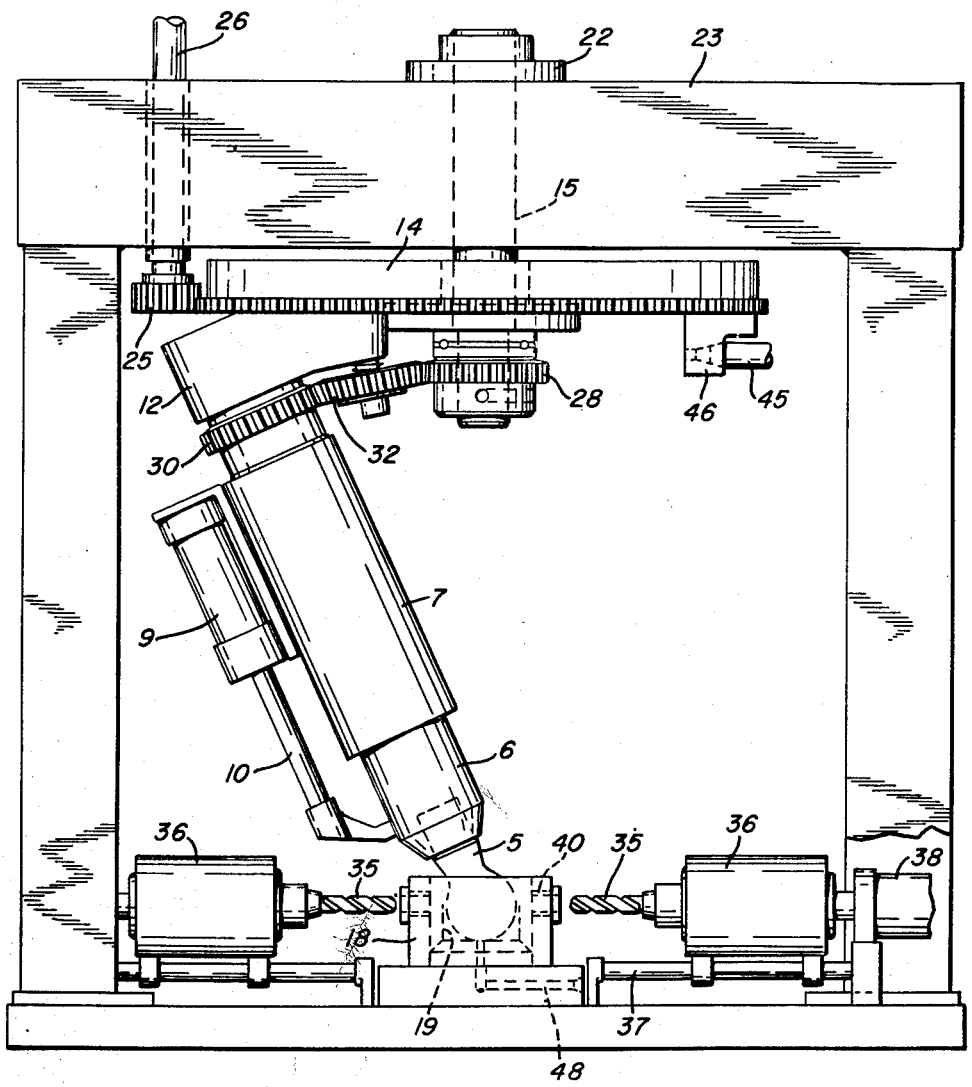
FIG. 1 is an elevation of equipment for milling lemniscate races in the male member.
Figure 2:
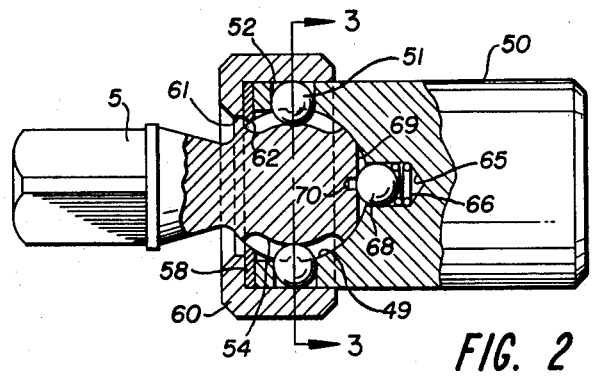
FIG. 2 is a side view, partly broken away, of the assembled universal joint.
Figure 3:
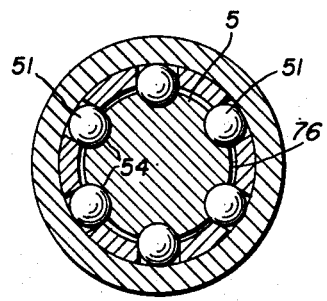
FIG. 3 is a section on the line 3—3 of FIG. 2 showing the two members and the ball bearings.
Figure 5:
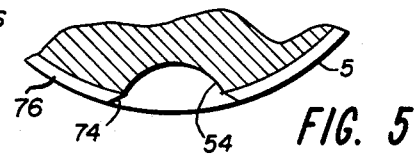
FIG. 5 is a section on the line 5—5 of FIG. 4.
Figure 6:
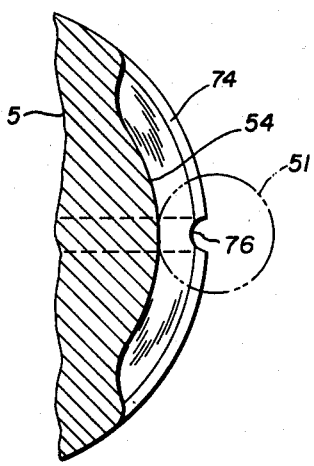
FIG. 6 is a section on the line 6—6 of FIG. 4.

FIGURE 1 shows in rather a schematic manner the equipment used for milling Bernoullian lemniscate races in a six-ball universal joint. The male member 5 of a universal joint is held in a chuck 6 in the angularly positioned rotating member 7, herein called the cylinder. The chuck may be of any usual design. The air or hydraulic cylinder 9 is illustrative of any type of motive device for lifting and lowering the chuck. The piston 10 raises and lowers the chuck 6 within the cylinder 7. It is to be understood that the cylinder 7 may be of any desired shape and construction.

The cylinder 7 is angularly and rotatably mounted on the bearing block 12 which, in turn, is fastened to rotate with the bull gear 14. The bull gear is rotatably mounted on the stationary main shaft 15 of the apparatus which is positioned exactly above the true center of the fixture 18 and the nest 19 within it. The knob of the male member is centered in the nest as the races are formed so that the center of the knob is then also in line with the axis of the main shaft 15.

The main shaft is supported by any suitable means 22 on the frame 23. The pinion 25 is driven by a motor or any other suitable source of energy through the shaft 26. It meshes with the bull gear and drives it.

The bevel gear 28 is rigidly mounted on the main shaft 15. The bevel gear 30 is rigidly attached to the cylinder 7 and the bearing block 12 so that they all move together. There are the same number of teeth in the bevel gears 28 and 30, and they both mesh with the idler gear 32 so that the motion of the cylinder 7 about the main shaft is a planetary motion, i.e. the cylinder rotates within the bearing 12 with the same area on the surface of cylinder 7 remaining at all times farthest from the axis of rotation of bull gear 14. Thus, as the male member 5 which is held in the chuck 6 rotates in the nest 19, the movement of the knob with respect to the several cutters 35 is generally up and down.

The end of each milling cutter 35 is hemispherical so that it cuts a path with a rounded bottom. It is rotated by any suitable means such as the motor 36. It is moved radially along the rod 37 by the cylinder 38 or other suitable means. Each is moved out from the nest before the male member is placed therein, or removed therefrom. Preferably, the apparatus provides a cutting member for each race, and they are operated and moved simultaneously. They pass through the drill bushings 40 in the fixture to make contact with the knob. Details for the simultaneous operation of the cutting members are not shown because they can easily be supplied by the man skilled in the art.

Any suitable type of automatic escapement 45, by movement in and out of the stop 46, will stop the movement of the bull gear after each complete revolution. That shown, is withdrawn from the stop after all of the members 35 have made an initial cut into the knob, to the desired depth, and the bull gear is allowed to rotate. The escapement is then returned to the position shown so that it will be contacted by the stop on completion of one revolution of the bull gear. On completion of each complete revolution the cutting members 35 are all simultaneously withdrawn from the nest. The cylinder may lift the chuck automatically and the finished male member may be replaced by a blank, and returned to the nest, all automatically.

A more detailed explanation follows: The chuck 6 is lifted manually or automatically by the cylinder 9 and loaded with a blank. A four-way valve is tripped and the part and chuck move downward until the part rests in the nest 19 within the fixture. It is held down by constant air or hydraulic pressure. Switches, etc. are not shown, as the manner in which such equipment may be used will be obvious to the man skilled in the art, once their use is suggested.

The moment that the male member is seated in the nest, a single-pulse limit switch is energized and opens a four-way valve causing the cutters to advance and engage the work piece to a pre-set depth. At this moment another single-pulse limit switch energizes the escapement and frees the bull gear 14 one complete revolution at the end of which it is stopped by the escapement. The pinion 25 driving the bull gear is protected by a slip clutch or other overload protective device.

After completion of the cutting cycle the cutters 35 are withdrawn from the fixture, and the four-way valve which operates the cylinder 9 causes the chuck to rise to a position at which the male member can easily be unloaded and a blank reloaded.

This apparatus mechanically produces the true movement of the ball or knob of the universal in its socket during which axial rotation of the knob is prevented due to the ball bearings which interlock the two members of the universal joint assembly. During the cycle the male member 5 is moved in a conical section, the apex of which is at the center of the knob, and the multiple cutters generate the correct path or races in the surface of the knob which the balls will subsequently duplicate when the universal joint is in use. The cutters which generate these races trace a true Bernoullian lemniscate. All of the races are advantageously generated simultaneously to provide a high production rate.

During the formation of the races, cutting oil or the like and coolant are fed through the line 48 to the nest and there, through multiple passages, to the various cutters.

Each cutter leaves a small raised islet in the center of each end of each lemniscate path. After the male member is removed from the nest 19, this is cut away. The islet is advantageously removed with a convex burr having a radius approximately the same as that at the root of the lemniscate, thereby conforming the bottom of each race to a sphere concentric with the surface of the knob. These races accurately accommodate the ball bearings and transmit constant-velocity motion from one member to the other regardless of the angle of the male and female member to each other.

The universal joint is preferably assembled in a novel manner. The knob of the male member 5 is placed in the socket 49 of the female member 50. Balls 51, arranged in the same pattern as the drill bushings 40 in the fixture 19, are held in openings in the socket. In the drawing the openings 52 are of uniform diameter and extend through the wall. Other means for holding the ball bearings may be used, and in a preferred design, small openings are drilled through the wall and subsequently spherical pockets for the ball bearings, of slightly larger diameter than the ball bearings, are milled in the inner surface of the cavity on the true center line of the male knob when assembled. Because of the manner in which the races are formed, either member will transmit constant-velocity rotary motion to the other member as they are rotated relatively to one another and the balls are moved within the races 54.

It it to be noted that the cylinder 7 can be at any angle greater than zero, but less than 45 degrees away from the axis of rotation, as represented by the axis of the male shaft 15 and the center of the ball. Thus the resulting joint is operative through any angle greater than zero and not as large as 90 degrees.

The male member is retained in the female member by the ring 58, the inner circumference of which fits against the surface of the ball or knob and holds it within the socket 49. The ring is held in place by the cap 60 which is press-fit over the socket against the walls of the female member, or held thereto in any other suitable manner. The ring 58 may be omitted if desired, and then the inner circumference 62 of the cap will bear against the surface of the knob. A ring is used when its inside diameter is necessarily smaller than the opening 61 in the cap.

At the bottom of the socket 49 is the opening 65 which holds the spring 66. The ball 68 is pressed by this spring against the flat surface 69 of the male member. This flat surface forms a spherical segment less than a great circle, perpendicular to the axis of the male member. A small detent 70 at the center of this surface may be provided to tend to keep the members aligned, once the ball has been centered on the flat surface. As the male member is moved out of alignment with the female member, some point in the spherical segment is brought nearer the opening 65 and the ball is pressed into it against the pressure of the spring. The tendency is for the spring to expand and apply pressure to the ball and this, in turn, tends to align the two members and locate the ball 68 in the detent 70.

Alternatively the ball and spring tension device are reversely mounted with the ball and spring located within the knob, and the flat surface 69 and detent 70 are omitted. The ball and tension device can be omitted, depending upon the application of the universal joint.

Figure 4:
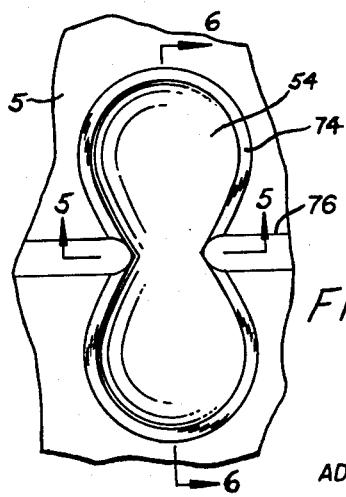
FIG. 4 is a plan view of one of the races.

FIGURE 4 shows the outline of the race 54 to be a lemniscate. The edges of the races are preferably beveled at 74 to prevent burrs from forming as the ball is moved under pressure against the wall of its race. The groove 76 eliminates what would otherwise be sharp projections into the raceway.

The invention is covered in the claims which follow.

What I claim is:

1. Apparatus for simultaneously cutting a plurality of Bernoullian lemniscate races for ball bearings in the knob of the male member of a universal joint with a plurality of mills each having a rounded end, which apparatus includes a spherically indented nest for supporting the knob therein, a plurality of mills about said nest to be moved radially in a plane toward the center of the knob, and means for describing a cone by a planetary movement of the axis of the knob about a perpendicular to said plane with the apex of the cone at said center.

2. The apparatus of claim 1 in which the means for describing a cone includes a bull gear with means for rotating it about its axis, a bearing block fastened to the bull gear with the axis of the bearing therein in line with the center of a knob when held in said location, means rotatable in said bearing for holding a knob and having a bevel gear thereon perpendicular to said axis, a second bevel gear with the same number of teeth mounted concentrically with the bull gear to rotate with it, and an idler gear in mesh with both bevel gears.

References Cited by the Examiner

UNITED STATES PATENTS

| 777,383 | 12/04 | Matson et al. | 64—7 |
| 2,297,551 | 9/42 | Greve | 90—20 X |
| 2,681,596 | 6/54 | Klomp | 90—20 |
| 2,867,145 | 1/59 | Marktrum. | |

WILLIAM W. DYER, Jr., *Primary Examiner.*